United States Patent
Lepp et al.

(10) Patent No.: US 11,362,898 B2
(45) Date of Patent: *Jun. 14, 2022

(54) NETWORK POLICY CONFIGURATION

(71) Applicant: BlackBerry Limited, Waterloo (CA)

(72) Inventors: James Randolph Winter Lepp, Ottawa (CA); Michael Peter Montemurro, Toronto (CA); Stephen McCann, Southampton (GB)

(73) Assignee: BlackBerry Limited, Waterloo (CA)

( * ) Notice: Subject to any disclaimer, the term of this patent is extended or adjusted under 35 U.S.C. 154(b) by 555 days.

This patent is subject to a terminal disclaimer.

(21) Appl. No.: 16/227,704

(22) Filed: Dec. 20, 2018

(65) Prior Publication Data

US 2019/0123964 A1   Apr. 25, 2019

Related U.S. Application Data

(63) Continuation of application No. 15/499,526, filed on Apr. 27, 2017, now Pat. No. 10,171,304.

(51) Int. Cl.
| | |
|---|---|
| *H04L 41/0893* | (2022.01) |
| *H04W 12/043* | (2021.01) |
| *H04W 12/37* | (2021.01) |
| *H04W 4/50* | (2018.01) |
| *H04L 41/0806* | (2022.01) |
| *H04W 8/26* | (2009.01) |
| *H04W 12/50* | (2021.01) |

(Continued)

(52) U.S. Cl.
CPC ...... *H04L 41/0893* (2013.01); *H04L 41/0806* (2013.01); *H04W 4/50* (2018.02); *H04W 8/265* (2013.01); *H04W 12/04* (2013.01); *H04W 12/043* (2021.01); *H04W 12/37* (2021.01); *H04W 12/50* (2021.01); *H04W 24/02* (2013.01); *H04W 84/12* (2013.01)

(58) Field of Classification Search
CPC .................................................. H04W 4/00-06
See application file for complete search history.

(56) References Cited

U.S. PATENT DOCUMENTS

| | | | |
|---|---|---|---|
| 8,341,717 B1 | 12/2012 | Delker | |
| 8,594,628 B1 * | 11/2013 | Schroeder | H04W 12/06 370/331 |

(Continued)

FOREIGN PATENT DOCUMENTS

| | | |
|---|---|---|
| EP | 3110207 A1 | 12/2016 |
| WO | 2016148548 A1 | 9/2016 |

OTHER PUBLICATIONS

Wi-Fi Alliance, Wi-Fi Certified Passpoint, Hotspot 2.0 (Release 2) Technical Specification, Version 1.0.0, "A Solution for Next Generation Wi-Fi Hotspots"; 2014; 207 pages.

(Continued)

*Primary Examiner* — San Htun
(74) *Attorney, Agent, or Firm* — Trop, Pruner & Hu, P.C.

(57) ABSTRACT

In some examples, a configurator device maps a configuration attribute received from a wireless device to a credential attribute, the credential attribute to be mapped to a network policy. The configurator device sends the credential attribute to the wireless device, the credential attribute useable by the wireless device to access an access point (AP), and useable by the AP to obtain the network policy to apply to a communication of the wireless device.

20 Claims, 3 Drawing Sheets

(51) Int. Cl.
*H04W 12/04* (2021.01)
*H04W 84/12* (2009.01)
*H04W 24/02* (2009.01)

(56) References Cited

U.S. PATENT DOCUMENTS

| | | | |
|---|---|---|---|
| 8,619,735 B2 | 12/2013 | Montemurro et al. | |
| 2008/0031194 A1* | 2/2008 | Yaqub | H04L 63/062 |
| | | | 370/331 |
| 2008/0076386 A1* | 3/2008 | Khetawat | H04M 3/16 |
| | | | 455/410 |
| 2015/0229475 A1* | 8/2015 | Benoit | H04L 9/14 |
| | | | 713/168 |
| 2016/0150412 A1 | 5/2016 | Liu | |
| 2016/0234124 A1* | 8/2016 | Tomici | H04W 28/24 |
| 2016/0234726 A1* | 8/2016 | Nuggehalli | H04W 36/0022 |
| 2016/0277370 A1* | 9/2016 | Lee | H04W 12/04 |
| 2016/0360407 A1 | 12/2016 | Benoit | |
| 2017/0063934 A1 | 3/2017 | Manroa et al. | |
| 2017/0078408 A1 | 3/2017 | Lepp et al. | |
| 2017/0257819 A1 | 9/2017 | McCann | |
| 2018/0048632 A1* | 2/2018 | Cammarota | H04L 9/3247 |
| 2018/0054845 A1 | 2/2018 | Lee | |

OTHER PUBLICATIONS

IEEE, Standard for Information Technology—Telecommunications and Information Exchange Between Systems Local and Metropolitan area networks—Specific Requirements; Part 11: "Wireless LAN Medium Access control (MAC) and Physical Layer (PHY) Specifications"; 2012; 2,793 pages.
Wikipedia; "Captive Portal"; https://web.archive.org/web/20150202195543/https://en.wikipedia.org/wiki/Captive_portal; Feb. 2, 2015; 6 pages.
Stephen McCann et al., U.S. Appl. No. 14/794,191 entitled Link Indication Referring to Content for Presenting at a Mobile Device filed Jul. 8, 2015 (44 pages).
3GPP TS 24.234 V12.2.0 Technical Specification 3rd Generation Partnership Project; Technical Specification Group Core Network and Terminals; 3GPP System to Wireless Local Area Network (WLAN) interworking; WLAN User Equipment (WLAN UE) to network protocols; Stage 3 (Release 12) Mar. 2015 (40 pages).
WiFi Alliance (http://www.wi-fi.org/who-we-are/current-work-areas) Who We Are—Current Work Areas—Early Devleopment, Applications Service Platform 2.0 downloaded Mar. 2, 2016 (7 pages).
Wiki—(https://wiki.iotivity.org/multi-phy_easy_setup) LOTIVITY—Multi-Phy Easy Setup last modified Jan. 21, 2016 (7 pages).
WiFi Alliance (http://www.wi-fi.org/certification/programs) Certification—Programs downloaded Mar. 2, 2016 (4 pages).
WiFi Alliance (http://www.wi-fi.org/news-events/newsroom/wi-fi-alliance-announces-certification-plans-for-ieee-80211g-wireless-lan) Wi-Fi Alliance Announces Certification Plans for IEEE 802.11g Wireless LAN Products, Feb. 25, 2003 (3 pages).
McCann et al., U.S. Appl. No. 15/058,545 entitled Provisioning a Device in a Network filed Mar. 2, 2016 (38 pages).
Akin, Devin, 802.11i Authentication and Key Management (AKM) White Paper, May 2005 (10 pages).
WiFi Alliance, Discover Wi-Fi—Wi-Fi Protected Setup downloaded Apr. 6, 2016 (4 pages).
WiFi Alliance, Draft, Wi-Fi Device Provisioning Protocol (DPP) Technical Specification, Version 0.0.11, Mar. 22, 2016 (59 pages), Best Available Date: 2005.
WiFi Alliance, Draft, Wi-Fi Neighbor Awareness Networking (NAN) Technical Specification, Version 1.0 r07, Jan. 18, 2016 (156 pages).
WiFi Alliance, Wi-Fi Simple Configuration Protocol and Usability Best Practices for the Wi-Fi Protected Setup™ Program, Version 2.0.1, Apr. 2011 (30 pages).
Stephen McCann et al., U.S. Appl. No. 15/094,819 entitled Managed Object to Provision a Device According to One of Plural Provisioning Techniques filed Apr. 8, 2016 (41 pages).
WiFi Alliance, Draft, Wi-Fi Device Provisioning Protocol (DPP) Technical Specification, Version 0.0.43, Feb. 16, 2017 (194 pages), Best Available Date: 2017.
WiFi Alliance (http://www.wi-fi.org/who-we-are/current-work-areas—Current Work Areas, Early Development, 802.11ax dated on or before Mar. 21, 2017 (5 pages).
Dan Walkes, Trellis-Logic LLC, WiFi Configuration for LoT Devices, Apr. 16, 2015 (5 pages).
WiFi Alliance, Wi-Fi Alliance Device Provisioning Protocol (DPP)—Draft Released for Public Reivew and Comments V0.0.23, Jan. 1, 2016 (90 pages), Best Available Date : 2016.
European Patent Office, International Search Report and Written Opinion for PCT/EP2018/059047 dated Jun. 4, 2018 (17 pages).
European Patent Office, Communication pursuant to Article 94(3) EPC for Appl. No. 18717326.5 dated Oct. 28, 2021 (9 pages).

\* cited by examiner

NETWORK POLICY CONFIGURATION

CROSS REFERENCE TO RELATED APPLICATION

This is a continuation of U.S. application Ser. No. 15/499,526, filed Apr. 27, 2017, which is hereby incorporated by reference in its entirety.

BACKGROUND

A wireless device can connect to a wireless network to perform communications with other endpoints. In some cases, before a wireless device can utilize a wireless network to perform communications, the wireless device is first provisioned with information to allow the wireless device to connect to the wireless network. In some examples, the provisioning can include providing the wireless device with credentials that can be used by the wireless device to connect to the wireless network.

BRIEF DESCRIPTION OF THE DRAWINGS

Some implementations of the present disclosure are described with respect to the following figures.

Figure 1:
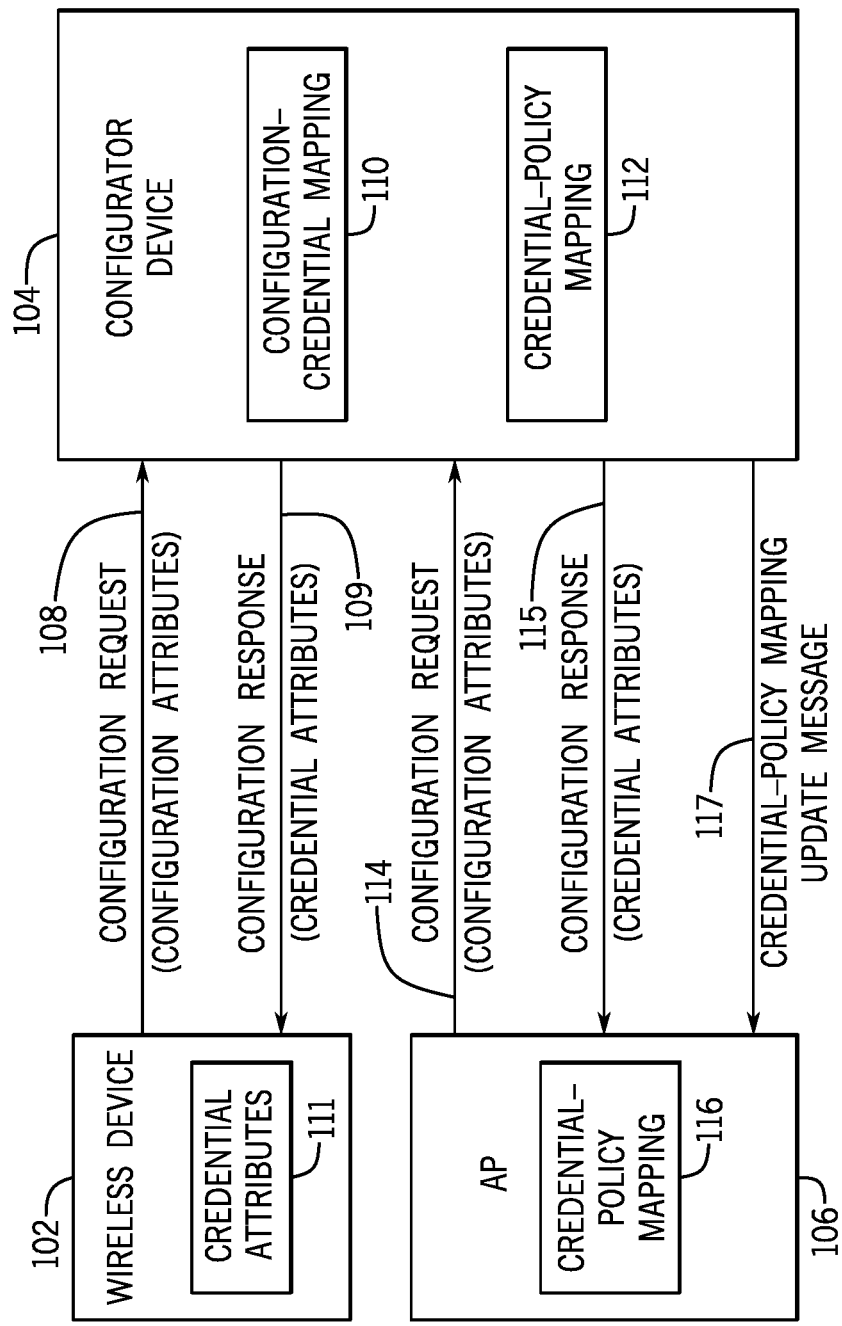
FIG. 1 is a block diagram of an example network arrangement that includes a configurator device, a wireless device, and an access point, according to some implementations.

Throughout the drawings, identical reference numbers designate similar, but not necessarily identical, elements. The figures are not necessarily to scale, and the size of some parts may be exaggerated to more clearly illustrate the example shown. Moreover, the drawings provide examples and/or implementations consistent with the description; however, the description is not limited to the examples and/or implementations provided in the drawings.

DETAILED DESCRIPTION

In the present disclosure, use of the term "a," "an", or "the" is intended to include the plural forms as well, unless the context clearly indicates otherwise. Also, the term "includes," "including," "comprises," "comprising," "have," or "having" when used in this disclosure specifies the presence of the stated elements, but do not preclude the presence or addition of other elements.

Generally, "provisioning" a wireless device can refer to providing the wireless device with specific information to allow the wireless device to establish connectivity with a wireless network so that the wireless device can perform communications through the wireless network with another endpoint. In some examples, the specific information that is provided to a wireless device as part of the provisioning process includes credentials, such as in the form of keys, user names and passwords, or other credentials. Such credentials can be used by the wireless device to securely connect to the wireless network.

A "wireless device" can refer to any type of electronic device that uses wireless communications. As examples, a wireless device can include any of the following: a portable computer, a smart phone, a tablet computer, a game appliance, a personal digital assistant (PDA), a wearable device (e.g. a smart watch, smart eyeglasses, etc.), a desktop computer, a vehicle (or an electronic device in a vehicle), a health monitor, a sensor device, a household appliance, a cargo transportation unit (e.g., a trailer, a container, etc.), an Internet of Things (IoT) device, and so forth.

Wireless devices can connect to other devices, such as access points (APs) or peer-to-peer (P2P) Group Owners, to obtain network connectivity. In some examples, within a wireless local area network (WLAN), wireless devices are able to establish wireless links with one or more APs. According to the Institute of Electronics and Electrical Engineers (IEEE) 802.11 protocol, an AP can be referred to as an AP STA (short for "station"). Wireless devices that communicate using the AP can be referred to as a non-AP STA. Although reference is made to the IEEE 802.11 protocol in some examples, it is noted that communications in a wireless network with APs can operate according to other protocols in other examples. In some embodiments, an AP can also be a non-AP STA, when the non-AP STA acts as a point of policy enforcement.

In further examples, wireless network connectivity can be according to Wi-Fi Direct, which provides a mechanism for a P2P network to be built on top of the IEEE 802.11 WLAN protocols. Wi-Fi Direct is specified by standards provided by the Wi-Fi Alliance (WFA). An arrangement of wireless devices that are able to communicate according to Wi-Fi Direct includes a P2P Group Owner (GO) and P2P client devices. The GO operates as an AP, while the client devices operate as non-AP STAs. The differences from infrastructure IEEE 802.11/Wi-Fi are the discovery and group formation procedures. Once the group is operating, the operation of the group is similar to that according to IEEE 802.11 in which a traditional AP is used.

Thus, in the context of Wi-Fi infrastructure communications, an AP can refer to a wireless access network node, while in the context of Wi-Fi Direct communications, an AP can refer to a P2P GO.

In further examples, wireless communications can occur using other types of wireless networks, including cellular access networks (such as those that operate according to the Long-Term Evolution (LTE) standards as provided by the Third Generation Partnership Project (3GPP), or alternatively, 5G standards), cellular IoT (such as wireless access networks according to LTE Advanced for Machine-Type Communication (LTE-MTC), narrowband IoT (NB-IoT), etc.), and so forth.

More generally, an AP can refer to any wireless node that allows a wireless device to establish wireless connectivity with a wireless network.

In some examples, provisioning of a wireless device can occur according to the Wi-Fi Alliance Device Provisioning Protocol (DPP). DPP provides a provisioning scheme in which a fixed network infrastructure to provide provisioning of wireless devices does not have to be provided. By using DPP, use of certain servers, such as an Authentication, Authorization, and Accounting (AAA) server, a policy database, a web server, and/or other network infrastructure entities can be avoided.

DPP uses a configurator device to provision other devices (enrollee devices) within a network, where the enrollee devices can include stations (STAs) such as mobile devices or other user devices, access points (APs), peer-to-peer (P2P) client devices, P2P GOs, P2P services client devices, Neighbor Awareness Networking (NAN) devices, or other types of devices. Any of a station, AP, or other device can also operate as a configurator device (referred to as a "DPP configurator"). Devices that have yet to be configured by the DPP configurator are called enrollee devices, and devices that have been configured by the DPP configurator are called peers. An AP is a special type of peer.

Generally, a "configurator device" can refer to any wireless device (e.g. a mobile device or an AP) in which an application or service is executed that is able to perform provisioning functionality. DPP operates between a pair of devices, where a first device takes on the role of configurator and the second device takes on the role of enrollee.

Although reference is made to provisioning techniques according to DPP, it is noted that in further examples, additional or alternative provisioning techniques can also be employed.

According to DPP, an enrollee can provide configuration attributes to a configurator device during a DPP configuration process. Various different configuration attributes can be provided, including any or some combination of the following, as examples: a Device Name (to identify a name of the enrollee device), a Device Type (to identify a type of the enrollee device), such as a tablet computer, a smartphone, a notebook computer, a sensor device, an appliance, etc., and so forth.

More generally, a "configuration attribute" can refer to an attribute that describes some property of the device sending the configuration attribute.

In response to the configuration attributes, the configurator device produces a DPP Configuration Object. Among the information included in the Configuration Object is a DPP Connector. The DPP Connector includes various attributes, referred to as Connector attributes. The Connector attributes can be used by a wireless device to connect to an AP (or another device). The Connector attributes are evaluated by the wireless device and the AP to determine whether the requested connection can be made. Examples of Connector attributes include any one or some combination of the following: netRole (which indicates the role of the wireless device, such as a station, an AP, a client, a group owner), Devices (which identifies devices that the wireless device is allowed to connect to), Groups (which identifies a group of devices to which the wireless device is allowed to connect), netAccessKey (which is a public key, signed by the configurator device, for use by the wireless device to establish a secure connection with another device), and so forth.

More generally, Connector attributes are examples of credential attributes. A "credential attribute" can refer to an attribute that is used by a wireless device to gain connectivity to an AP or a wireless network.

Generally, existing DPP configuration processes do not provide for mechanisms or techniques to define network policies in a "lightweight" manner. A "network policy" can refer generally to a criterion or a rule (or multiple criteria and/or multiple rules) that govern the communication of data once a network connection has been established between a wireless device and an AP. If other network devices, such as authentication servers and so forth, other than a configurator device have to be involved to set network policy, then the provisioning or configuration process may become more complex, and thus may no longer be considered "lightweight." Moreover, although a network policy can be configured on an AP, such network policy would apply to any wireless device that connects to that AP, such that device-specific network policies cannot be applied, or device-specific policies would be applied in a cumbersome manner.

In accordance with some implementations of the present disclosure, lightweight solutions are provided to set a network policy governing communication of data by a wireless device once the wireless device has established network connectivity with an AP. The setting of device-specific network policies can be achieved by using a configurator device, such as a DPP configurator device, without involving other types of network devices, such as authentication servers.

Examples of network policies can include any or some combination of the following:

- A communication filtering policy, which specifies that a communication of information (including traffic data or control information) is subject to filtering according to a rule or criterion (or multiple rules and/or criteria). For example, a communication filtering policy can specify that incoming traffic from a specific Internet Protocol (IP) address or range of IP addresses be blocked.
- A quality of service (QoS) policy, which specifies that a communication of information is subject to management to ensure that the communication satisfies a specified QoS specification. For example, a QoS specification can specify that a given communication (from a given wireless device or including a given type of traffic data) is to be communicated with a latency of less than a specified threshold. As another example, a QoS specification can specify that voice traffic from voice devices, such as a telephone, is to be assigned a higher priority over other traffic.
- A location-based resource access policy, which controls access of resources by wireless devices from specific locations. For example, a location-based resource access policy can specify that a resource can only be accessed from within an intranet location, and not from a remote location outside the intranet.
- A time-based resource access policy, which controls access of resources within specified time windows. For example, a time-based resource access policy can specify that a connection to a specific server can occur only during business hours, and not outside of business hours.
- A connection duration policy, which controls how long a connection can be maintained before a disconnection should be initiated. For example, a duration of connection policy can specify that a connection that has been idle (no user input, for example) for greater than a specified time duration is to be disconnected.

Although examples of network policies are provided above, it is noted that in other examples, alternative or additional network policies can also be specified.

FIG. 1 is a block diagram of an example network arrangement that includes a wireless device 102, a configurator device 104, and an AP 106. In some examples, a configurator device 104 is to provision the wireless device 102 and the AP 106. For example, the configurator device 104 can be a DPP configurator. More generally, the configurator device 104 can be a different type of configurator device.

To perform a DPP configuration process, the wireless device 102 sends a configuration request 108 to the configurator device 104, where the configuration request 108 can include configuration attributes of the wireless device 102. For example, the configuration request 108 can be a DPP configuration request. More generally, a configuration request can refer to a request sent by the wireless device 102 to provision the wireless device 102 in a wireless network such that the wireless device 102 is able to establish a connection with the wireless network.

The configurator device 104 has access to a configuration-credential mapping 110, which can be stored in a storage system. The storage system can be part of the configurator device 104, or can be remote from the configurator device 104 but accessible by the configurator device 104.

The configuration-credential mapping 110 maps configuration attributes to credential attributes. In response to the configuration attributes received in the configuration request 108, the configurator device 104 accesses the configuration-credential mapping 110, and retrieves the corresponding credential attributes to send back to the wireless device 102 in a configuration response 109. For example, the configuration response 109 can be a DPP configuration response, which includes a Configuration Object that has Connector attributes, which include credential attributes.

The credential attributes received in a configuration response 109 by the wireless device 102 from the configurator device 104 are stored as 111 in a storage medium of the wireless device 102.

In some examples, a mapping between a configuration attribute and a credential attribute or a mapping between a configuration attribute and a credential attribute can be provided through a user interface (either web-based on directly through an application) on the configurator device 104 or on a different device. In further examples, there can be default mappings for a home environment, such as for a set-top box, a home computer, a gaming console, a child's device, an adolescent's device, an appliance, and so forth, or for any other type of environment.

According to DPP, configuration attributes and credential attributes (e.g., Connector attribute) are carried in JavaScript Object Notation (JSON) objects. The JSON format is extensible such that additional configuration or credential attributes can be added, in addition to those defined by the applicable standard, such as the DPP standard. Note that other equivalent encodings can be used to carry the attributes such as Extensible Markup Language (XML), Abstract Syntax Notation One (ASN.1) or another encoding.

The ability to define additional configuration attributes and/or credential attributes allows for a mapping between configuration attributes and credential attributes, in addition to a mapping between credential attributes and network policies. The added configuration attributes and/or credential attributes can be used in setting network policies for wireless devices according to the lightweight solutions according to some examples of the present disclosure.

As further shown in FIG. 1, the configurator device 104 has access to a credential-policy mapping 112, which maps credential attributes (e.g., DPP Connector attributes) to respective network policies. The credential-policy mapping 112 can be stored in a storage system that is part of the configurator device 104, or can be remote from the configurator device 104 but accessible by the configurator device 104

As used here, the term "mapping" can refer to any information that can be used to correlate a first element to a second element, such as to correlate a configuration attribute to a credential attribute, or to correlate a credential attribute to a network policy. For example, the mapping can be in the form of a mapping table, including a first column of configuration attributes and a second column of credential attributes. In other examples, the mapping can be expressed as rules (e.g., IF-THEN rules), where if a configuration attribute is a particular configuration attribute, then the correlating credential attribute is a particular credential attribute.

The following are examples of configuration attributes: Device Type (which can be set to Camera, Sensor, Tablet, Smartphone, and so forth), Resolution (to indicate the resolution of the camera), Encoding (to indicate the type of encoding applied to data of the wireless device 102), Outdoor (to indicate whether the wireless device 102 is used outdoors or indoors), and so forth.

The following provides examples of a configuration-credential mapping 110. If the configuration attribute, Device Type, is "camera," then the credential attribute that can be assigned can be "SecuritySystem," which can in turn be mapped to a specific network policy that governs a resource accessible by the wireless device 102. As another example, a configuration attribute specifying a type of encoding, such as H.264 encoding, can be mapped to "PrioritizeVideoTraffic," which can be mapped to a network policy to give higher priority to the H.264 encoded data. As a further example, if the Device Type is Camera, then a credential attribute of "NoInternet" can be assigned, to indicate that the wireless device of type camera is not allowed to access the internet.

Examples of the credential-policy mapping 112 are set forth below. If the credential attribute is SecuritySystem, then the mapping 112 maps the credential attribute to a network policy specifying that allow access to a specific website or IP address is allowed. If the credential attribute is NoInternet, then the mapping 112 maps the credential attribute to a policy that restricts traffic of the wireless device 102 to a local network. If the credential attribute is PrioritizeVideoTraffic, then the mapping 112 maps the credential attribute to a network policy specifying that higher priority is to be assigned to the video data of the wireless device 102.

FIG. 1 further shows a configuration process between the AP 106 and the configurator device 104. The AP 106 can send a configuration request 114 (e.g., a DPP configuration request) to the configurator device 104, to perform configuration of the AP 106. The configuration request 114 can include configuration attributes of the AP 106.

In response to the configuration request 114, the configurator device 104 can send a configuration response 115 back to the AP 106. The configuration response 115 can include credential attributes, which can be stored by the AP 106. In addition, the configuration response 115, or a different message (such as a credential-policy mapping update message 117) sent by the configurator device 104 to the AP 106, can include the credential-policy mapping 112 (or a portion of the credential-policy mapping 112). In response to receiving the credential-policy mapping 112, the AP 106 can store a copy 116 of the received credential-policy mapping 112 (or portion of the credential-policy mapping 112) in a storage medium of the AP 106, or the AP 106 can update a previous version of the credential-policy mapping (portion) stored at the AP 106 with the received credential-policy mapping (portion).

In some examples of the present disclosure, the credential-policy mapping 112 can be updated at any time, such that existing credential attributes can be mapped to different network policies, or new credential attributes can be added and mapped to respective network policies. The updating of the credential-policy mapping 112 can be performed by a network administrator or by a control application, for example. In some examples, a DPP Configuration Object can contain a Network Policy node that includes the credential-policy mapping 112.

Figure 2:
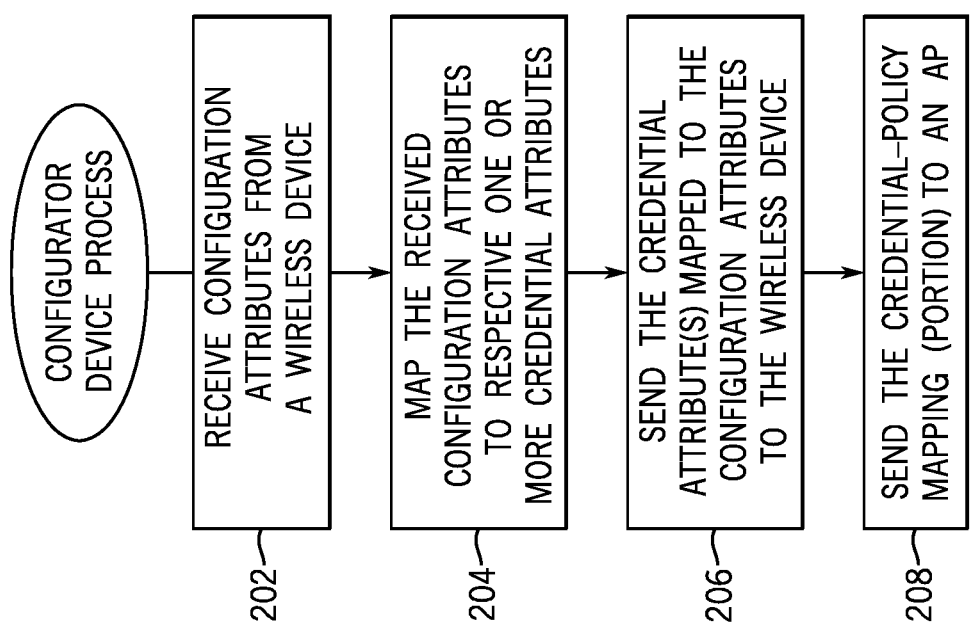
FIG. 2 is a flow diagram of an example process performed by a configurator device according to some implementations.

FIG. 2 is a flow diagram of a process performed by the configurator device 104 according to some examples of the present disclosure. The configurator device 104 has access to the configuration-credential mapping 110 that maps configuration attributes to credential attributes, and the credential-policy mapping 112 that maps credential attributes to network policies.

The configurator device 104 receives (at 202) configuration attributes from a wireless device (e.g., 102 in FIG. 1). The configurator device 104 maps (at 204) the received configuration attributes to respective credential attributes. As noted above, at least some of the credential attributes can be mapped to one or more network policies. The configurator device 104 sends (at 206) the credential attribute(s) mapped to the configuration attributes to the wireless device, where the credential attribute(s) is (are) useable by the wireless device to access an AP (e.g., 106 in FIG. 1), and the credential attribute(s) is useable by the AP to obtain one or more network policies to apply to a communication of the wireless device.

In some examples, the configurator device 104 can send a list of configurator devices to the wireless device. This list of configurator devices can be a credential attribute, and can identify those configurator devices that the wireless device is authorized to access to perform provisioning.

In some examples, the list of configurator devices can include a list of identities (e.g., network addresses or other identities) of the configurator devices, where the identities can be hashed or otherwise scrambled. Hashing the identities of the configurator devices obfuscates the identities of the configurator devices to prevent a hacker from gaining unauthorized access of such identities.

The configurator device 104 further sends (at 208) the credential-policy mapping 112 (or a portion of the credential-policy mapping 112) to the AP. The sending of the credential-policy mapping (portion) to the AP can be performed as part of a configuration process of the AP by the configurator device 104, or alternatively, can be performed at a different time. The credential-policy mapping (portion) that is sent to the AP can be an initial credential-policy mapping (portion), i.e., the AP does not previously have a copy of the credential-policy mapping (portion), or alternatively, can be an updated credential-policy mapping (portion) to update a previous version of the credential-policy mapping (portion) at the AP.

Although FIG. 2 refers to interaction of the configurator device 104 with just one wireless device and one AP, it is noted that in other examples, the configurator device 104 can provision multiple wireless devices and/or multiple APs.

Figure 3:
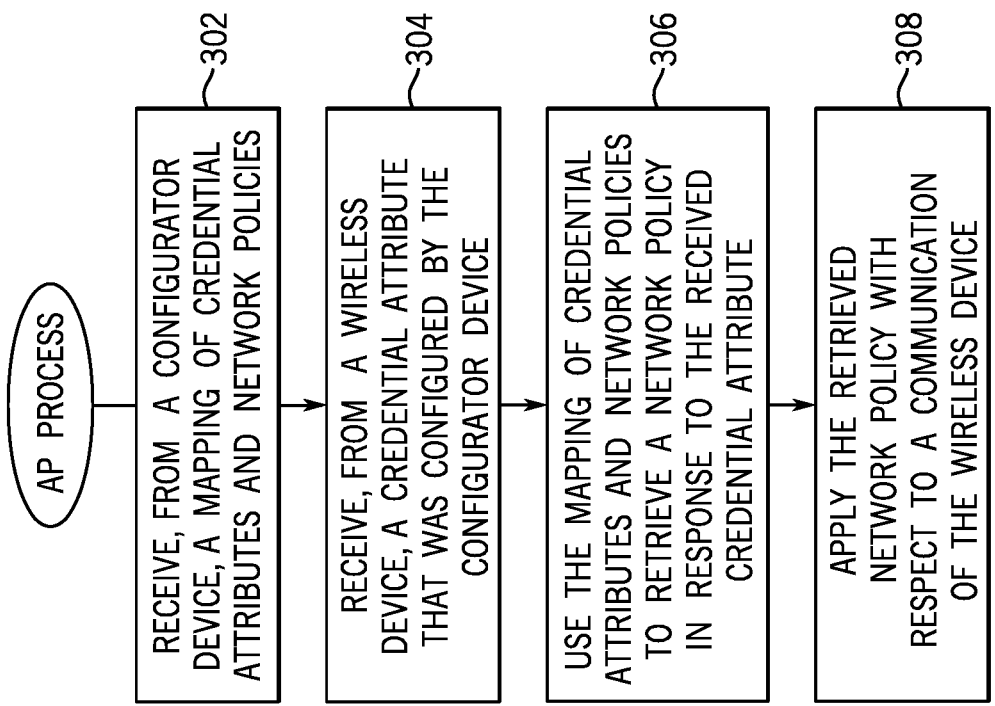
FIG. 3 is a flow diagram of an example process performed by an access point according to some implementations.

FIG. 3 is a flow diagram of a process performed by an AP, such as the AP 106 of FIG. 1. The AP receives (at 302), from a configurator device (e.g., 104 in FIG. 1), a mapping of credential attributes and network policies (e.g., the credential-policy mapping 112 of FIG. 1). The AP receives (at 304), from a wireless device (e.g., 102 in FIG. 1), a credential attribute that was configured by the configurator device. The credential attribute of the wireless device was configured by the configurator device as part of a configuration process (e.g., a DPP configuration process). The wireless device sends the credential attribute to the AP for use in establishing a connection between the wireless device and the AP. Although reference is made to receiving a credential attribute in the singular sense, it is noted that in further examples, the AP can receive multiple credential attributes from the wireless device for establishing a connection between the wireless device and the AP.

The AP uses (at 306) the mapping of credential attributes and network policies to retrieve a network policy in response to the received credential attribute from the wireless device. For example, if the mapping is a mapping table, then the received credential attribute can be used to select an entry of the mapping table to retrieve the corresponding network policy. Alternatively, if the mapping is expressed as an IF-THEN rule, then application of this rule using the received credential attribute produces the corresponding network policy.

The AP applies (at 308) the retrieved network policy with respect to a communication of the wireless device. For example, the AP can perform filtering of traffic data communicated by the wireless device, or ensure that the communication of the wireless device satisfies a QoS specification, and so forth.

Figure 4:
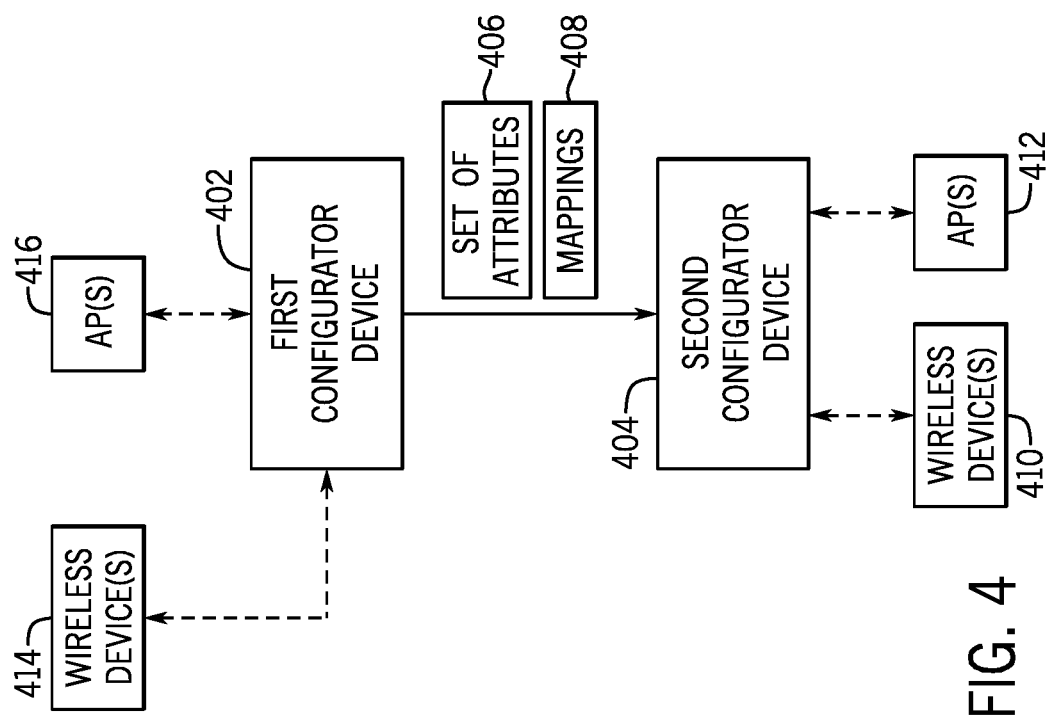
FIG. 4 is a block diagram showing a first configurator device configuring a second configurator device, according to further implementations.

FIG. 4 is a block diagram showing a first configurator device 402 configuring a second configurator device 404. During a configuration process between the first configurator device 402 and the second configurator device 404 in which the first configurator device configures the second configurator device 404, the first configurator device 402 sends a set of attributes 406 and mappings 408 to the second configurator device 404. The set of attributes 406 includes configuration attributes and credential attributes that are to be used by the second configurator device 404 to configure wireless device(s) 410 and AP(s) 412. The mappings 408 can include a configuration-credential mapping that maps between configuration attributes and credential attributes, and a credential-policy mapping that maps between credential attributes and network policies.

By configuring the second configurator device 406 with the set of attributes 406 and the mappings 408, the second configurator device 406 can use the same set of attributes and the same mappings used by the first configurator device 402 in configuring wireless device(s) 414 and AP(s) 416.

In some examples, the credential attributes sent by a configurator device to a wireless device or an AP are protected from unauthorized access. For example, the credential attributes can be signed using an encryption key.

Figure 5:
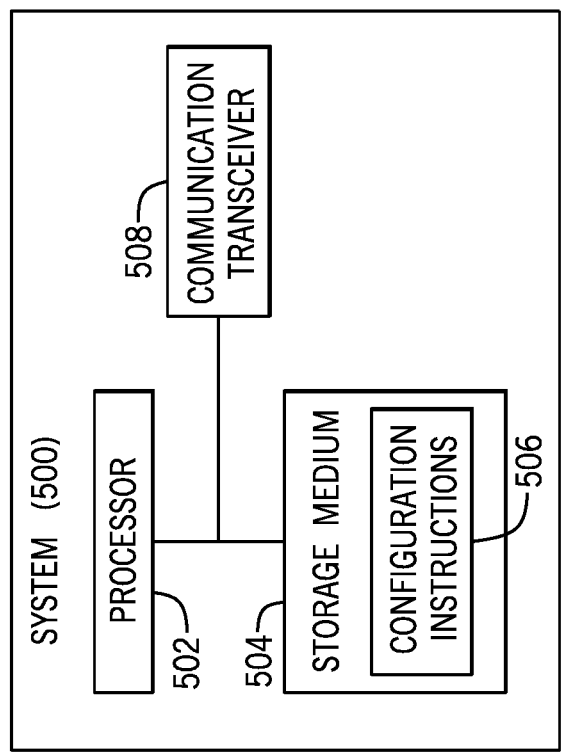
FIG. 5 is a block diagram of an example system according to some implementations.

FIG. 5 is a block diagram of a system 500 according to some examples. The system 500 can be any of the wireless device 102, the configurator device 104, and the AP 106. The system 500 includes a processor 502 (or multiple processors). A processor can include a microprocessor, a core of a multi-core microprocessor, a microcontroller, a programmable integrated circuit, a programmable gate array, or another hardware processing circuit.

The system 500 further includes a non-transitory machine-readable or computer-readable storage medium 504 storing machine-readable instructions, such as configuration instructions 506 that are executable on the processor 502 to perform various tasks as discussed in the present disclosure. Instructions executable on a processor can refer to the instructions executing on one processor or on multiple processors.

The system 500 includes a communication transceiver 508, such as a wireless transceiver to communicate wireless signals (e.g., radio frequency or RF signals).

The storage medium 504 can include any or some combination of the following: a semiconductor memory device such as a dynamic or static random access memory (a DRAM or SRAM), an erasable and programmable read-only memory (EPROM), an electrically erasable and programmable read-only memory (EEPROM) and flash memory; a magnetic disk such as a fixed, floppy and removable disk; another magnetic medium including tape; an optical medium such as a compact disk (CD) or a digital video disk (DVD); or another type of storage device. Note that the instructions discussed above can be provided on one computer-readable or machine-readable storage medium, or alternatively, can be provided on multiple computer-readable or machine-readable storage media distributed in a large system having possibly plural nodes. Such computer-readable or machine-readable storage medium or media is (are) considered to be part of an article (or article of manufacture). An article or article of manufacture can refer to any manufactured single component or multiple components. The storage medium or media can be located either in the machine running the machine-readable instructions, or located at a remote site from which machine-readable instructions can be downloaded over a network for execution.

In the foregoing description, numerous details are set forth to provide an understanding of the subject disclosed herein. However, implementations may be practiced without some of these details. Other implementations may include modifications and variations from the details discussed above. It is intended that the appended claims cover such modifications and variations.

What is claimed is:

1. A method comprising:
   accessing, by a configurator device, a first mapping comprising information that maps between configuration attributes and respective credential attributes;
   accessing, by the configurator device, a second mapping comprising information that maps between credential attributes and respective different network policies;
   sending, by the configurator device, a first credential attribute to a wireless device, the first credential attribute mapped using the first mapping to a configuration attribute received from the wireless device, and the first credential attribute useable by the wireless device to access an access point (AP); and
   sending, by the configurator device to the AP, the second mapping that maps between credential attributes and respective different network policies for configuring the AP.

2. The method of claim 1, wherein the second mapping sent to the AP by the configurator device is for use by the AP in obtaining, responsive to the first credential attribute received by the AP from the wireless device, a corresponding network policy to apply to a communication of the wireless device, the corresponding network policy mapped to the first credential by the second mapping.

3. The method of claim 1, wherein the configuration attribute from the wireless device comprises a Device Provisioning Protocol (DPP) configuration attribute, and the first credential attribute comprises a DPP Connector attribute.

4. The method of claim 1, wherein the configuration attribute from the wireless device is in a configuration request received from the wireless device, and the first credential attribute sent to the wireless device is in a configuration response sent to the wireless device.

5. The method of claim 1, wherein the sending of the first credential attribute to the wireless device is part of a configuration process of the wireless device by the configurator device, and the sending of the second mapping is part of a configuration process of the AP by the configurator device.

6. The method of claim 5, wherein the configuration process of the wireless device by the configurator device is performed without an authentication server different from the configurator device.

7. The method of claim 1, wherein a network policy of the different network policies is selected from among a communication filtering policy, a quality of service policy, and a location-based resource access policy.

8. The method of claim 1, further comprising:
   sending, by the configurator device to the AP, an update of the second mapping that causes updating of the second mapping stored at the AP.

9. The method of claim 1, wherein the configurator device is a first configurator device, the method further comprising:
   configuring, by the first configurator device, a second configurator device to use the second mapping.

10. The method of claim 9, wherein the configuring of the second configurator device further comprises configuring the second configurator device to use a common set of attributes as the first configurator device.

11. The method of claim 9, wherein the configuring of the second configurator device further comprises configuring, by the first configurator device, the second configurator device to use the first mapping.

12. The method of claim 1, further comprising:
   providing, to the wireless device, a list of authorized configurator devices, wherein the list of authorized configurator devices includes a scrambling of identities of the authorized configurator devices.

13. The method of claim 1, wherein the configuration attribute from the wireless device describes a property of the wireless device, and the first credential attribute is an attribute for use by the wireless device in gaining connectivity to the AP.

14. The method of claim 1, further comprising:
   as part of a configuration process of the AP by the configurator device:
      receiving, by the configurator device from the AP, a configuration request including a configuration attribute of the AP,
      wherein the sending of the second mapping by the configurator device to the AP is in response to the configuration request received from the AP.

15. A configurator device comprising:
   a communication transceiver to communicate with an access point (AP) and a wireless device;
   at least one processor; and
   a non-transitory storage medium storing instructions executable on the at least one processor to:
      access a first mapping comprising information that maps between configuration attributes and respective credential attributes;
      access a second mapping comprising information that maps between credential attributes and respective different network policies;
      cause sending, through the communication transceiver, of a first credential attribute to the wireless device, the first credential attribute mapped using the first mapping to a configuration attribute received from the wireless device, and the first credential attribute useable by the wireless device to access an access point (AP); and
      cause sending, through the communication transceiver to the AP, of the second mapping that maps between credential attributes and respective different network policies for configuring the AP.

16. The configurator device of claim 15, wherein the configuration attribute from the wireless device describes a property of the wireless device, and the first credential attribute is an attribute for use by the wireless device in gaining connectivity to the AP.

17. The configurator device of claim 15, wherein the at least one processor is configured to further:
- as part of a configuration process of the AP by the configurator device:
  - receive, through the communication transceiver from the AP, a configuration request including a configuration attribute of the AP,
  - wherein the sending of the second mapping by the configurator device to the AP is in response to the configuration request received from the AP.

18. The configurator device of claim 15, wherein the second mapping is for use by the AP in obtaining a corresponding network policy to apply to a communication of the wireless device wirelessly connected to the AP, the obtaining of the corresponding network policy based on mapping, by the AP using the second mapping, the first credential attribute received by the AP from the wireless device to the corresponding network policy.

19. The configurator device of claim 15, wherein the configuration attribute from the wireless device is in a configuration request from the wireless device, and the first credential attribute sent to the wireless device is in a configuration response sent to the wireless device.

20. A non-transitory machine-readable storage medium comprising instructions that upon execution cause a configurator device to:
- access a first mapping comprising information that maps between configuration attributes and respective credential attributes;
- access a second mapping comprising information that maps between credential attributes and respective different network policies;
- send a first credential attribute to a wireless device, the first credential attribute mapped using the first mapping to a configuration attribute received from the wireless device, and the first credential attribute useable by the wireless device to access an access point (AP); and
- send, to the AP, the second mapping that maps between credential attributes and respective different network policies for configuring the AP.

* * * * *